Jan. 24, 1961 G. SCHAEFFLER 2,969,266
NEEDLE OR ROLLER BEARING
Filed Aug. 4, 1958
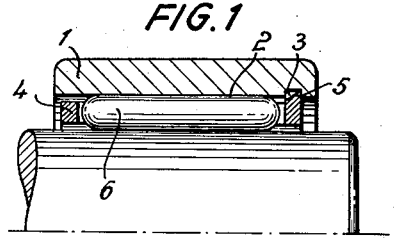
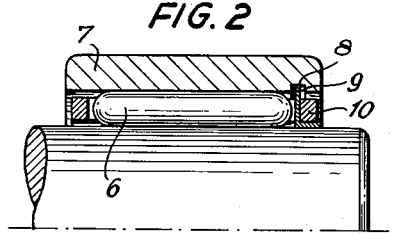
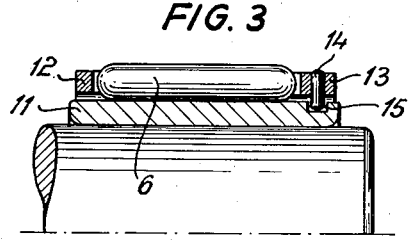
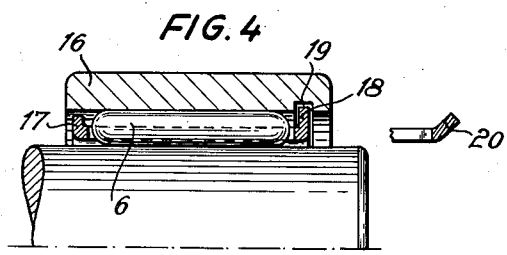
INVENTOR

United States Patent Office 2,969,266
Patented Jan. 24, 1961

2,969,266

NEEDLE OR ROLLER BEARING

Georg Schaeffler, Herzogenaurach, Germany, assignor to Industriewerk Schaeffler oHG, Herzogenaurach, Germany, a German company Filed Aug. 4, 1958, Ser. No. 752,960

Claims priority, application Germany Aug. 6, 1957

7 Claims. (Cl. 308—212)

This invention relates to rimless needle or roller bearings.

The rims, more particularly on non-divided races, which delimit the roller elements or the cages in the axial direction, make assembly of the roller elements and the cages difficult. The production of the raceways requires machining between the rims, with the known difficulties which this entails, or requires the subsequent fitting and possibly fastening of the rims.

In most needle roller bearings or elongated-roller bearings provided with cages, the rims are used for guiding the cage in the axial sense at one end face. For operational or assembly reasons, it is generally indispensable to fix the cage in the axial direction.

An object of the present invention is to provide an axial fixing system for the cage without using the known rims or abutment discs for this purpose.

According to the present invention there is provided a rimless bearing comprising a race formed in its raceway with an annular groove, and a cage for roller elements which cage is provided with a radially extending projection engaging the groove to prevent axial dsiplacement of the cage relatively to the race.

Particularly simple and favourable conditions are obtained by using elastic projections which, with slight pressure, snap into the groove provided in the raceway. A construction of this kind can be provided, for example in rimmed sheet metal cages, by first of all arranging the rims in inclined manner on the cage wall, thus giving them an external diameter which is only slightly greater than the diameter of the outer raceway or only slightly less than the diameter of the inner raceway. When a cage of this kind is pushed with slight pressure into the raceway and its rim wall arrives at the groove plane, the rim wall snaps into the groove. Then if the cage is subjected to pressure in the opposite direction, the cage rim edge bears against the groove edge, the rim is erected and assumes a larger diameter, so that the cage is then guided axially in both senses in the groove. A simliar procedure can be adopted with a plastic cage having a projecting rim. In both cases, this manner of mounting is assisted by the elastic compression or expansion of the whole cage.

The projections projecting radially from the cage wall can be constructed as a closed ring or can be distributed in a conical formation about the periphery; for example, in the case of sheet metal cages the outer rim edge can be interrupted in the manner of a toothed wheel, in order to improve elasticity.

In many cages there is no possibility of having elastic projections. In such cases the projections are formed-on or inserted after the cage has been inserted in position in the closed raceway. This can be effected either at one point or at several points of the cage, so that the projections extending out of the cage wall engage in one or more grooves. For example comb-like segments can be inserted in such a manner from the exterior or from the interior into the end faces of the windows, that they project beyond the cylindrical wall surface of the cage, or pins can be inserted in the cage wall which project outwardly or inwardly into a groove in the raceway.

All forms of the projections, which are arranged predominantly near the raceways, can be used at the same time for guiding the cage in the radial direction and in the axial direction.

If after insertion, the axial guiding of the cage is taken over by additional elements, e.g. discs, the projections are only used when the bearing is handled during transport and at the time of assembly. In this case they can be of very light construction and can also be demountable, if necessary.

For a better understanding of the invention and to show how the same may be carried into effect, reference will now be made to the accompanying drawings, wherein:

Figure 1 is a longitudinal sectional view of a needle cage having a rim engaging into the groove in a race ring;

Figure 2 is a longitudinal sectional view of a needle roller cage with projections on the end faces of the windows;

Figure 3 is a longitudinal sectional view of a cage with pins projecting into a groove in the inner race;

Figure 4 is a longitudinal sectional view of an outer race having a cage whose relatively large-diameter rim projects into the groove in the race.

According to Figure 1, 1 is a race for a needle roller bearing, having a raceway 2 which is provided with a groove 3 in the vicinity of one end face. The cage 4 comprises at one side a projection 5 which engages in the groove 3 expediently by snapping into the said groove elastically. The bearing needles 6 are guided in axially parallel manner in the cage 4 by conventional axial webs.

In the form of embodiment according to Figure 2, 7 is a race which is constructed similarly to the race 1 of Figure 1 and is provided with a groove 8 near the raceway for the bearing needles. The needles are guided in the cage 10. At one side, projections 9 project through the windows of the cage into the groove 8. The projections can be fixed in various ways on the cage, e.g. by flanging-over the annular end 10 of the cage.

In similar manner to the outer race, a groove can also be provided in the inner race for taking over the axial guiding of the cage through the agency of the projections.

Figure 3 shows an inner race 11 with a cage 12 in whose extended end 13 pins 14 are inserted radially. The pins project into the groove 15 in the race 11, the said groove being arranged near the raceway for the needles.

Such pins can be used, for example, only for the transport of the inner race with cage and needles and can be removed at the time when axial discs are mounted adjacent the inner race on the shaft, the diameter of the said discs constituting an axial abutment for the cage.

Figure 4 shows a particularly practical form of embodiment. Inserted in the outer race 16 is a cage 17 with needles, whose relatively large-diameter rim 18 projects into the groove 19. For inserting the cage in the raceway, it may be expedient first of all to construct the rim 18 so that it is situated in an inclined manner as indicated at 20, and only to bring the inclined portion 20 into the position 18 directed perpendicularly to the axis after the cage is inserted in the race.

I claim:

1. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including a radially directed projection extending from one of said end rings into a single annular groove formed in said sleeve near one end thereof, for preventing, during operation of the bearing, axial displacement of said cage and of said roller elements guided by the cage, relatively to said race sleeve.

2. A bearing as claimed in claim 1, wherein said projection is of resilient formation for snapping engagement in said groove during assembly of the bearing.

3. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including an annular radially directed flange integral with and extending circumferentially of one of said end rings into a single annular groove formed in said sleeve near one end thereof, for preventing, during operation of the bearing, axial displacement of said cage and of said roller elements guided by the cage, relatively to said race sleeve.

4. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including a pin mounted in a radial aperture in one of said end rings and extending radially into a single annular groove formed in said sleeve near one end thereof, for preventing, during operation of the bearing, axial displacement of said cage and of said roller elements guided by the cage, relatively to said race sleeve.

5. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including a clip of resilient formation embracing one of said end rings and having a radially directed part extending into a single annular groove formed in said sleeve near one end thereof, for preventing, during operation of the bearing, axial displacement of said cage and of said roller elements guided by the cage, relatively to said race sleeve.

6. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including a projection formed initially as an axially outwardly inclined portion at one end of said cage, said inclined portion being displaced, during assembly of the bearing, to project radially from the cage into engagement with a single annular groove formed in said sleeve near one end thereof, for preventing, during operation of the bearing, axial displacement of said cage and of said roller elements guided by the cage, relatively to said race sleeve.

7. A bearing comprising a continuous rimless race sleeve having a circumferentially extending raceway, a plurality of circularly arranged circumferentially spaced cylindrical roller elements disposed in rolling engagement with said raceway, and a one-piece cage having two axially spaced continuous end rings disposed one at each end of said series of roller elements, a corresponding plurality of circumferentially spaced axial webs integral at the opposite ends thereof with said end rings, said webs being disposed between said roller elements, and locating means including a plurality of spaced radially directed projections extending from one of said end rings into a single annular groove formed in said sleeve near one end thereof, for preventing, during operation of the bearing, axial displacement of said cage and of said roller elements guided by the cage, relatively to said race sleeve.

References Cited in the file of this patent

UNITED STATES PATENTS

| | | |
|---|---|---|
| 688,927 | Bunnell | Dec. 17, 1901 |
| 1,108,722 | Dohner et al. | Aug. 25, 1914 |
| 1,494,712 | Scheffler | May 20, 1924 |
| 1,611,976 | Williford | Dec. 28, 1926 |

FOREIGN PATENTS

| | | |
|---|---|---|
| 128,111 | Great Britain | June 19, 1919 |